United States Patent Office 3,773,883
Patented Nov. 20, 1973

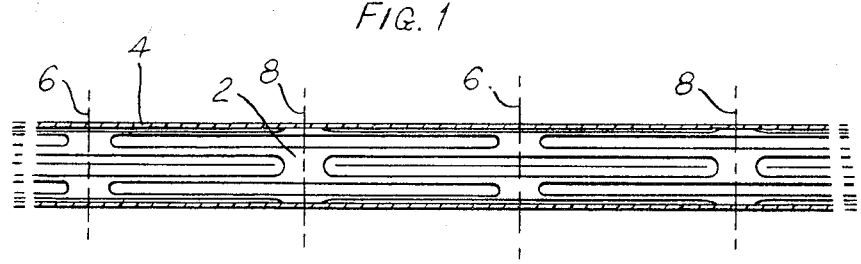
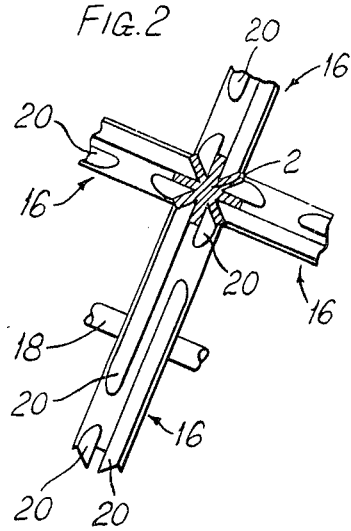
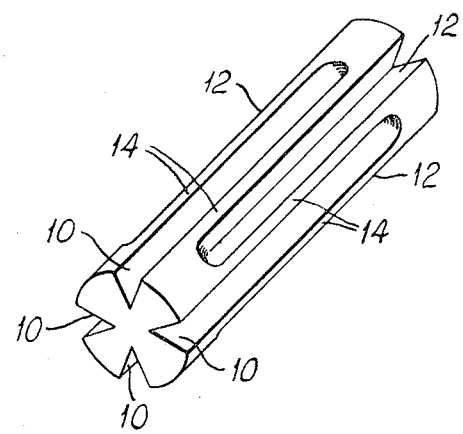
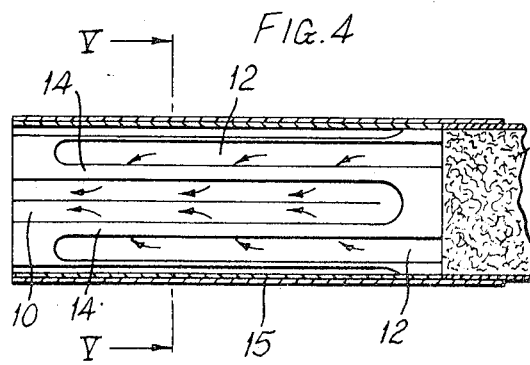
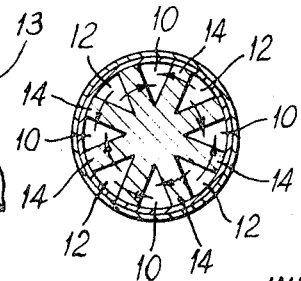

---

3,773,883
PREPARING CIGARETTE FILTERS
Francis Auguste Maurice Labbe, Neuilly-sur-Seine, France, and Michael Bruce Mitchell, London, England, assignors to Molins Limited, London, England
Filed July 14, 1971, Ser. No. 162,513
Claims priority, application Great Britain, July 17, 1970, 34,754/70
Int. Cl. A24c 5/50; B29c 17/00
U.S. Cl. 264—151                                      7 Claims

ABSTRACT OF THE DISCLOSURE

Cigarette filters are made by passing a continous rod of filter material continuously through a moving die to form a continuous filter element having a repeated pattern of staggered grooves so arranged that the continuous filter element can be cut at regular intervals to form individual filter elements each having in its peripheral surface a number of grooves extending substantially axially alternately from opposite ends of the element.

---

This invention is concerned with a cigarette filter comprising a filter element closely surrounded by a wrapper, the filter element being formed in its peripheral surface with grooves extending substantially axially into the element alternately from opposite ends of the element so as to define a number of circumferentially spaced passages through which cigarette smoke can enter the filter, and a number of circumferentially spaced axial passages through which the smoke can leave the filter after passing through the ribs formed between the grooves. In other words, each groove extends from one end of the filter element and stops short of the other end. The smoke is filtered during its passage through the ribs.

The total flow area for the smoke through the ribs can be made large compared with the cross-sectional area of a conventional filter of the same diameter, so that the smoke velocity through the filtering material is relatively low and the filtering efficiency is relatively high for a given pressure drop through the filter.

There may for example be three or four grooves extending axially into the filter element from each end, making a total of six or eight grooves.

A filter according to this invention is preferably made by forming a continuous filter element which is then cut at regular intervals (preferably after being enclosed in a continuous wrapper) to form individual sections for cigarettes. The continuous cigarette filter element is preferably formed by passing filter element material through a die comprising a number of die parts each having a die surface which is movable towards and away from the centre of the die and is so shaped that the continuous filter element formed by the passage of the material through the die has a repeated patern of staggered grooves so arranged that the continuous filter element can be cut at regular intervals to form individual filter elements each having in its peripheral surface a number of grooves extending substantially axially alternately from the opposite ends of the element. The arrangement of the grooves is such that when the continuous element is cut into short sections at appropriate positions, each section when surrounded by a wrapper makes up a filter in the form already described.

The die through which the filter material is extruded preferably comprises a number of co-operating wheels driven at the same speed as the filter element material, each wheel being formed with at least one circumferentially extending rib which forms one of the grooves in the continuous filter element during each revolution of the wheel. The filter material may be supplied to the die as an already formed rod, the rod being simply shaped in the appropriate manner by the die.

The filter element may for example be formed from cellulose acetate tow with sufficient plasticizer to enable the cellulose acetate to hold its shape after being formed with the grooves.

An example of a filter element and of a method of manufacture according to the present invention will now be described with reference to the accompanying drawings. In these drawings:

FIG. 1 shows a continuous filter which is to be cut into individual filter sections;

FIG. 2 is a cross-section through the filter element, showing the die wheels which shape the continuous filter element;

FIG. 3 is a perspective view of the filter element for a single cigarette;

FIG. 4 is a side view of part of a cigarette, with the wrapping broken away to show the filter element; and FIG. 5 is a section on the line V—V in FIG. 4.

As shown in FIG. 1, the continuous filter consists of a filter element 2 surrounded by a wrapper 4. This continuous filter is cut at regularly spaced lines 6 (which represent the pattern-repeat points of the grooves in the filter element) to form double-length filters. Each double-length filter is then joined between two cigarette lengths by means of a strip of joining paper which is wrapped and glued round the filter with its sides overlapping onto the cigarette lengths. Each double-length filter-tipped cigarette is then cut across the middle (i.e. in effect at lines 8 in FIG. 1) to separate the double cigarette into individual filter-tipped cigarettes.

As shown particularly by FIG. 3, each filter element consists of four circumferentially spaced V-sectioned grooves 10 which extend into the filter from one end and stop short of the other end, while between these grooves 10 there are four similar grooves 12 which extend into the filter from the opposite end and again stop short of passing right through the filter element. Accordingly in the completed cigarette as shown in FIG. 4, smoke from a cigarette length 13 passes into the filter through the grooves 12 and leaves the filter to enter the smoker's mouth through the grooves 10, having passed transversely through the ribs 14 formed between the grooves. It should be noted, as shown in FIG. 5, that the grooves are so shaped in cross-section that the ribs 14 have parallel sides; thus the resistance to smoke flow through the ribs is uniform.

As shown in FIG. 4, the filter is joined to the cigarette length by a strip of paper or other material 15 which is glued round the filter and overlaps onto the cigarette length.

As shown in FIG. 2, the continuous filter element is extruded to the required shape by a die consisting of four similar wheels 16, of which only one is shown complete with its drive shaft 18. The axes of rotation of the four wheels are all in a common plane. The filter element material, for example a tow of cellulose acetate or other fibrous material, is passed through the die in a direction normal to this common plane. Thus the fibres of the tow extend longitudinally in the finished filter element. The peripheral surfaces of the wheels together form a moving die surface. Each wheel in the particular example shown has four V-sectioned ribs 20; that is two on each side of a central plane through the wheel. The ribs on opposite sides of the central plane are staggered in the appropriate manner to form the staggered grooves in the continuous filter element.

The filter element material may, for example, be fed to the die in the form of a rod of approximately the same diameter as the finished filter element.

It will be appreciated that the wheels are all driven at a speed such as to produce a peripheral velocity equal to the velocity of the filter element material passing through the die formed by the wheels. In other words the wheels act by rolling the filter element material into the required shape.

Instead of the continuous filter element being enclosed in a wrapping before it is cut into double-filter lengths, it may be cut into double-filter lengths before being enclosed in a wrapping. In this case the wrapping for the filter may be the paper which joins the filter to the cigarette length. In other words, in FIG. 4 the filter element may be surrounded only by the layer 15 of paper or other wrapping material which in this case would be glued round the filter element and to the end of the cigarette length.

We claim:

1. A method for making cigarette filters comprising
   (a) forming filter material into a continuous rod,
   (b) feeding said continuous rod of filter material along a predetermined path,
   (c) shaping the continuous rod by at least one moving die which provides said rod with a plurality of circumferentially-spaced longitudinally-extending rows of grooves separated by a plurality of longitudinally extending ribs adapted for flow of cigarette smoke therethrough in a direction transverse to the axis of the rod, each row comprising a plurality of individual elongated grooves arranged successively in spaced end-to-end relationship in a longitudinal direction with filter material occupying the space between the ends of adjacent grooves in each row and each groove of each row overlapping longitudinally with at least two successive grooves of each adjacent row of grooves, each rib extending continuously between adjacent rows of grooves, and
   (d) cutting the formed continuous rod at the space between the ends of successive grooves in at least one row into filter lengths such that none of the grooves in said filter lengths fully extend between opposite ends thereof.

2. A method according to claim 1 comprising forming a plurality of circumferentially spaced V-sectioned grooves with a longitudinally extending rib between each groove of each row at least two successive grooves of each adjacent row of grooves, said V-sectioned grooves being so shaped in cross-section that substantially parallel sides are formed on said ribs to maintain uniform flow of smoke through said ribs between adjacent grooves in different rows.

3. A method according to claim 1 comprising forming grooves of substantially the same length, the grooves of alternate rows being axially aligned, and cutting the filter material at the space between the ends of successive grooves of said alternate rows.

4. A method according to claim 3 comprising cutting the filter material at the space between the ends of successive grooves of the rows intermediate said alternate rows.

5. A method according to claim 1 comprising
   (a) rotating a plurality of wheels, each having at least one rib projecting from the peripheral surface thereof, arranged with their peripheries forming a moving die about said path, and
   (b) feeding said continuous rod through said moving die to form said grooves in said continuous rod.

6. A method according to claim 1 in which the continuous rod is enclosed in a continuous wrapper and is then cut into double filter lengths for joining between two cigarette lengths.

7. A method for making cigarette filters comprising
   (a) forming filter material into a continuous rod,
   (b) feeding said continuous rod of filter material along a predetermined path,
   (c) rotating a plurality of wheels arranged with their peripheries forming a moving die about said path, each of said wheels having at least one rib projecting from the peripheral surface thereof on each side of a central plane through the wheel, the ribs on one side of the central plane being staggered with respect to the ribs on the opposite side of the central plane to form said continuous rod with a plurality of circumferentially-spaced longitudinally-extending rows of grooves, each row comprising a plurality of grooves arranged successively in a longitudinal direction and each groove of each row overlapping longitudinally with at least two successive grooves of each adjacent row of grooves, and
   (d) cutting the formed continuous rod between the successive grooves in at least one row into lengths.

References Cited

UNITED STATES PATENTS

| | | | |
|---|---|---|---|
| 1,967,585 | 7/1934 | Minton | 131—261 B |
| 2,033,867 | 3/1936 | Segal | 131—261 B |
| 3,538,210 | 11/1970 | Gatto | 264—237 |
| 3,579,623 | 5/1971 | Thomson et al. | 264—151 |
| 2,931,748 | 4/1960 | Muller | 264—286 |
| 3,180,911 | 4/1965 | Muller | 264—119 |
| 3,546,325 | 12/1970 | Muller | 264—174 |
| 2,954,773 | 10/1960 | Lebert | 264—151 |
| 2,979,433 | 4/1961 | MacHenry | 264—119 |
| 3,520,963 | 7/1970 | Allseits et al. | 264—237 |

ROBERT F. WHITE, Primary Examiner

J. R. THURLOW, Assistant Examiner

U.S. Cl. X.R.

131—10.3, 10.5, 261 B; 264—157, 167, 174, 284